United States Patent
Titschert et al.

(10) Patent No.: US 7,239,498 B2
(45) Date of Patent: Jul. 3, 2007

(54) MINING SOLENOID

(75) Inventors: Jens Titschert, Lünen (DE); Hans-Udo Rheiner, Menden (DE)

(73) Assignee: DBT GmbH, Lunen (DE)

( * ) Notice: Subject to any disclaimer, the term of this patent is extended or adjusted under 35 U.S.C. 154(b) by 227 days.

(21) Appl. No.: 10/957,053

(22) Filed: Oct. 1, 2004

(65) Prior Publication Data
US 2005/0078428 A1    Apr. 14, 2005

(30) Foreign Application Priority Data
Oct. 10, 2003 (DE) .................. 103 47 877

(51) Int. Cl.
*H01H 9/00* (2006.01)
(52) U.S. Cl. .................................. 361/160
(58) Field of Classification Search ............ 361/139, 361/160; 251/129.01, 129.1; 36/139
See application file for complete search history.

(56) References Cited

U.S. PATENT DOCUMENTS

| | | | |
|---|---|---|---|
| 3,643,129 A * | 2/1972 | Marsh | 361/11 |
| 3,975,666 A | 8/1976 | Redding | |
| 4,557,293 A | 12/1985 | Guens et al. | |
| 4,642,725 A * | 2/1987 | Vincent et al. | 361/154 |
| 6,055,161 A * | 4/2000 | Church et al. | 363/22 |
| 6,985,345 B2 * | 1/2006 | Hermann et al. | 361/139 |
| 2003/0179534 A1 | 9/2003 | Hermann et al. | |

FOREIGN PATENT DOCUMENTS

| | | |
|---|---|---|
| DE | 32 29 835 C2 | 2/1984 |
| DE | 33 28 309 A1 | 2/1985 |
| DE | 34 15 649 A1 | 11/1985 |
| DE | 36 23 908 A1 | 1/1998 |
| DE | 102 12 092 A1 | 10/2003 |
| GB | 2 205 010 A | 11/1988 |
| GB | 2 305 561 A | 4/1997 |
| GB | 2 386 774 A1 | 9/2003 |
| JP | 2004169763 A * | 6/2004 |

* cited by examiner

*Primary Examiner*—Stephen W. Jackson
*Assistant Examiner*—Boris Benenson
(74) *Attorney, Agent, or Firm*—Fay Sharpe LLP

(57) ABSTRACT

The invention relates to a mining electromagnet for the switching of hydraulic pilot valves or main control valves used in underground mining operations, with a coil which can be connected to an intrinsically-safe power unit, with an armature which can be displaced by application of current to the coil and with an electronic control device 20, by means of which the current which is conducted to the coil can be set during the drawing-in phase of the armature to an excitation current, and in its holding phase can be set to a holding current which is lower than the excitation current. According to the invention, a storage means 24, 25 is allocated to the mining electromagnet 2, 3, said storage means being capable of being charged with the power unit voltage of the power unit 23, and switched in series with the power unit by the initiation of a switching process for the electromagnets, and which, by means of its discharge during the duration of the drawing-in phase, causes an increase in the voltage imposed at the coil of the electromagnet which is to be switched. In preferred embodiments of the invention, twice as many electromagnets can be switched in the same time and supplied with one common power unit.

19 Claims, 1 Drawing Sheet

MINING SOLENOID

Figure 1:
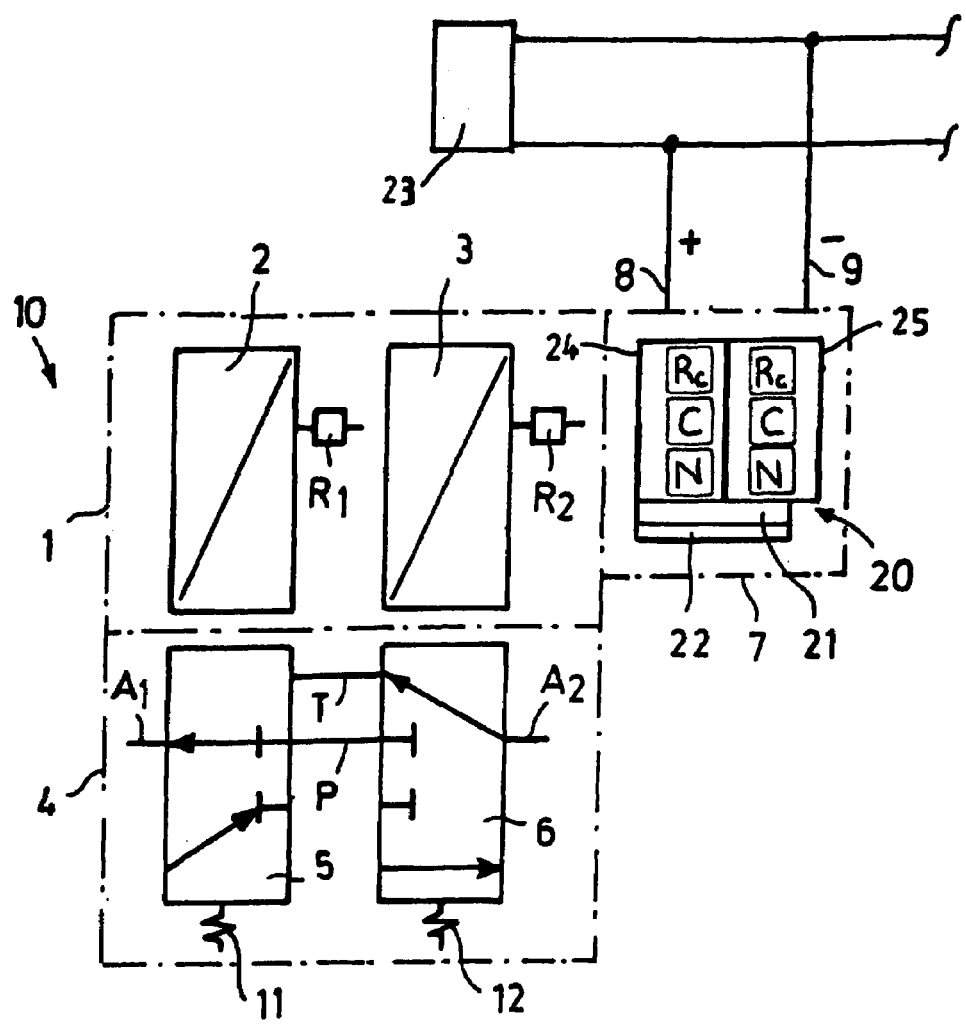

The invention relates to a mining electromagnet for the switching of hydraulic pilot valves or main control valves used in underground mining operations, with a coil which can be connected or attached to an intrinsically-safe power unit which serves to provide its current and voltage, with an armature which can be displaced by current flowing through the coil and with an electronic control device, by means of which the current which is fed to the coil can be adjusted to an excitation current in the draw-in phase of the armature and in the holding phase of the armature can be adjusted to a holding current which is lower than the excitation current.

During the operation of underground electrohydraulic systems, such as, for example, support units for supporting the underground working room behind the face for digging out the coal, due to the risk of explosion and firedamp the electrical voltage and current supply for the electromagnets which are to be switched is provided by means of intrinsically-safe power units and inherently-safe DC circuits. Because of the intrinsic safety of the power unit and the entire underground power circuit, the residual energy in the event of a malfunction is so low that even a spark would not have sufficient energy to trigger an explosion. Because of the limited power values, incurred due to the system, which are available for the switching process, and which can be produced with the intrinsically-safe power units, it is usual, with an electronic control device allocated to the electromagnets, for the holding current to be reduced in the holding phase to a current level which is lower than the excitation current (U.S. Pat. No. 4,557,293). In underground mining operations, electromagnets with corresponding control devices are also referred to as electromagnets with holding current reduction (retaining current reduction). During the reduction of the holding current to the lower holding current level, the remanence force which is created during the switching process of the electromagnet is used to hold the armature and therefore to hold the closure body of the pilot valve or main control valve in one of its two switching positions. The armature of the electromagnet and of the closure bodies of the hydraulic valves are, as a rule, moved back into the initial starting position after the electromagnet is switched off due to the resetting force of a spring. For these reasons, and in order to reduce the heat generated and dissipated with the intrinsically-safe power units, the effort is made in underground mining to actuate and switch as many electrohydraulic valves of the support units as possible with one single power unit.

As an alternative to the holding current reduction known from U.S. Pat. No. 4,557,293, it is proposed in U.S. Ser. No. 2003/0179534 A1 by Applicants that the actual current in the coil of the electromagnet which is to be switched be measured continuously and used as a reference signal for the holding current reduction. Due to the fact that the movement of the armature induces a change in the actual current, the optimum moment for reducing the current being supplied to the holding current level can be found by means of continuous measurement, and applied for reducing the holding current.

With the mining electromagnets used in underground mining, it has been conventional hitherto for no current flow to take place before the activation of the electromagnet, and for the coil of the electromagnet not to consume energy until a switching process for a specific electromagnet has been initiated by a superordinated control device. During the switching process, each individual electromagnet then has a comparably high overall current consumption.

The problem of the invention is to create an electromagnet for use in underground mining which is improved with regard to efficiency and performance, but without a reduction in the number of electromagnets which can be supplied by one power unit.

This problem is resolved according to the invention in that storage means are allocated to the mining electromagnet which can be charged with the power unit voltage of the power unit, said storage means being capable of being switchable or actually being switched in series to the power unit by the initiation of a switching process for the electromagnet, and, as a result of discharge during the duration of the drawing-in phase, causes an increase in the voltage applied to the coil of the electromagnet which is to be switched in relation to the supply voltage of the power unit. With the solution according to the invention, the voltage applied to the electromagnet increases with the beginning of the switching process for the electromagnet. When the switching process is initiated, the storage means is switched in series to the power unit supplying the coil, so that, as a result of the connection to the power unit and the simultaneous discharge of the storage means, an increase in the coil voltage occurs without any visible increase in current consumption being caused for the power unit. As the sharpness of the rise of the exponential function of a coil behaves in an inversely proportional manner to the voltage present, the switching time before the armature movement of the electromagnet can be reduced by increasing the supply voltage. Because of the higher supply voltage, a shorter time span passes until the moment at which the armature has reached its end position. This moment corresponds to the end of the draw-in phase and the optimum beginning of the holding current phase. Due to the shortening of the drawing-in phase, the holding current phase can be set to an earlier moment and the additional output from the power unit which results from this can be used to switch other electromagnets.

In a preferred embodiment, the mining electromagnet is designed in such a way that the storage means can be charged with the supply voltage of the power unit independently of the switching state of the electromagnet, so that, after each switching procedure or after the completion of each drawing-in phase, the storage means is already charged again and is available for a further switching process. The storage means preferably consists of a capacitor. In order to limit the influence of the additional storage means on the power unit, it is further of advantage if a dropping resistor for limiting or preliminary adjustment of the charge current supplied to the storage means is electrically connected upstream of the storage means. For the operation of the mining electromagnet in underground operation, it is particularly advantageous if the storage means or the capacitor are dimensioned in such a way or adjusted in their capacity so that a voltage increase is guaranteed at least until the end of the drawing-in phase, and for preference exactly up to the end of the drawing-in phase. The storage means can in particular be dimensioned and selected in such a way that the voltage applied in the drawing-in phase is doubled in comparison with the supply voltage of the power unit. As a result of this, the switching time or switch-through duration until the end of the drawing-in phase is halved without a voltage increase being switched.

In one possible embodiment, the storage means is integrated into the control device, with which the reduction in the holding current is effected. This makes it possible, after the capacitor has discharged, for the actual supply voltage of the power unit to be adjusted again, which is then reduced with the control device to the holding current level, so that in the holding current phase no increase in the operating current is caused.

The control device can in particular be provided with a measuring device to measure the actual current in the coil, and an evaluation device for recognising a movement of the armature on the basis of the actual current measured, as is disclosed in detail in U.S. Ser. No. 2003/0179534 A1 (DE 102 12 092 A1) from Applicants, to which express reference is made in this respect.

The storage means enables shortening of the switching time up to the ending of the armature movement and this offers particular advantages if several electromagnets are being switched on is cascade fashion with the control device or with a superordinated switching device. As a result of the cascaded switching of several electromagnets it is possible, with the same visible current consumption for the power unit, for double the number of actuators to be switched through within the same period of time, or it is possible, within the same period of time, for the same number of actuating magnets or solenoids to be switched through at half current. For the cascaded switching with the control device, it is of particular advantage if two electromagnet assemblies with coil and armature, arranged in a common housing, are allocated to each control device. The superordinated switching device can, in particular, consist of a face control device or a support unit controller for an underground electrohydraulic support shield. In this situation, individual storage means should be allocated to each electromagnet.

Figure 2:
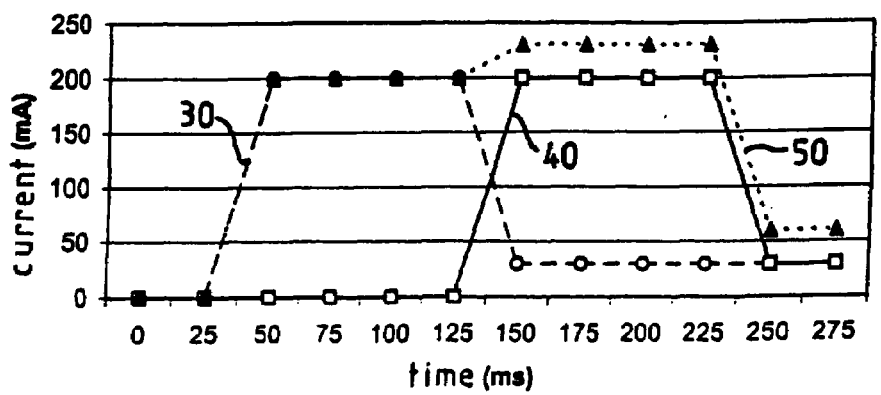

An embodiment of the invention is now explained with reference to the drawings, which show:

FIG. 1 a diagrammatic representation of an electrohydraulic control valve for underground use with two electromagnet assemblies, two hydraulic multi-way valves, and a control device allocated to them; and FIG. 2 in a curve diagram, the current consumption of the electromagnets and the overall current consumption.

The electrohydraulic control valve designated in FIG. 1 overall by 10 is of modular design and comprises an electromagnet housing 1 with two electromagnet assemblies or electromagnets respectively, 2,3, which in each case, as known, exhibit an armature, not shown, as well as a coil, likewise not shown. By feeding current to the respective coil windings of each of the electromagnets 2,3, the armatures of the electromagnets can be moved backwards and forwards between an initial position and a final position. The electromagnet housing 1 is flanged to a valve block 4, which accommodates several hydraulic multi-way valves 5,6, which can be switched independently of one another by means of the electromagnets 2,3. In underground mining, eight hydraulic valves are frequently arranged in a common valve block. The hydraulic valve 5 in FIG. 1 is located in a switching position in which a load connection $A_1$ is connected to the high-pressure line P for a hydraulic fluid. The armature of the electromagnet 2 is located accordingly in its end position. The hydraulic valve 6 in FIG. 1 is located in its initial position, in which a load connection $A_2$ is connected to a return line T. The armature of the electromagnet 3, with which the hydraulic valve 6 is switched, is located accordingly in its initial position.

The electrohydraulic valve 10 additionally comprises an electronic housing 7 secured to the electromagnet housing 1 to accommodate an electronic control device, designated overall by 20. The electromagnets 2,3, are connected via the electronic control device 20 to a further superordinated face or support unit control device, not shown. To supply current to the coils of the electromagnets 2,3, these are connected via the lines 8,9 to an intrinsically-safe power unit 23, whereby, at the same time, additional electromagnets of electrohydraulic control valves are supplied with voltage and current respectively by the intrinsically-safe power unit 23. With the control device 20, a reduction can be effected in the holding current in the holding phase of the electromagnet 2,3, such as is known, for example, from U.S. Ser. No. 2003/0179534 A1 or U.S. Pat. No. 4,557,293. In the embodiment shown, a measuring shunt or resistor $R_1$ and $R_2$ respectively is allocated in each case to the coils of both electromagnets 2,3, with which the actual current in the coil windings of the electromagnets 2,3 can be measured, in order, by the evaluation of the actual current measured by means of a microprocessor 21 of the control device 20, for the actual current to be reduced to a lower holding current level in a time-optimum manner. The reduction to the holding current level can in particular be carried out by pulse width modulation with a pulse width modulation setting unit 22.

According to the invention, respective storage means 24 and 25 are allocated to electromagnets 2,3, which in the embodiment according to FIG. 1 are integrated into the control device 20, but could also be arranged at another location, in particular also in a superordinated face or support unit control device such as a support unit controller. Both storage means 24, 25 comprise for preference in each case a capacitor C, connected upstream of which is a series resistor Rc for limiting the charge current for the capacitor C. Both storage means 24, 25 are charged via the lines 8,9 with the supply voltage from the power unit 2,3, independently of the switching state of the electromagnets 2,3. Both storage means 24,25 are provided for the purpose, during the drawing-in phase of the armature, of increasing rapidly the voltage present at the coils of the electromagnets 2,3 in comparison with the supply voltage which can be applied with the power unit 23. The storage means 24 is allocated, for example, to the coil of the electromagnet 2, and the storage means 25 to the coil of the electromagnet 3. If a switching signal for switching the electromagnet 2, or, respectively, the hydraulic valve 5 actuated by the electromagnet, is now issued from a superordinated control device, for example, the storage means 24 will be switched in series with the power unit 23 via its respective transistor or other switch or switch means N, so that, as a result of the discharge of the capacitor C of the storage means 24, for example, a doubling of the voltage present at the coil of the electromagnet 2 can be set. As a result of this, the switching-through time is halved between the initiation of the switching process for the electromagnet 2 and the moment at which the armature of the electromagnet 2 reaches its end position, in which the hydraulic valve 5 is switched, in comparison with an electromagnet which is supplied exclusively with the supply voltage of the power unit 23.

In the same way it is possible, after a switching process for the electromagnet 3 has been initiated, for the voltage present at the coil of the electromagnet 3 to be doubled by the series switching of the capacitor C of the storage means 25 with the power unit 23 via its respective transistor or other switch or switch means N, and therefore for the switching-through time for the electromagnet 3 to be halved. The switching of the two electromagnets 2,3 is preferably effected in cascade fashion, whereby the cascaded switching is effected either by the microprocessor 21 or via a superordinated switching device.

The effect which can be achieved with the storage means 24, 25 according to the invention and the cascaded switching is now explained by reference to FIG. 2. Represented in FIG. 2 is the current consumption of the two cascaded electromagnets 2,3, switched with voltage doubling. In this situation, the line 30 shows the current consumption of the coil of the electromagnet 2, and the line 40 represents the current consumption of the electromagnet 3. For the purpose of explanation and understanding of FIG. 2, it is assumed that a conventional, generic type of electromagnet, switched with the supply voltage of the power unit 23 has a current consumption of 200 mA in the drawing-in phase and a current consumption of 30 mA in the holding phase, whereby the switching time of this electromagnet up to the beginning of the holding phase is 200 ms. By means of the capacitor of the storage means 24, according to the invention, being switched on and discharging in the drawing-in phase, a doubling of the momentary coil supply voltage is achieved, as a result of which the switching-through time of the electromagnet 2, as the line 30 in FIG. 2 shows, is halved to 100 ms. The current for the coil of the electromagnet 2 is then reduced to the half current value of 30 mA. In the same way, the switching time of the electromagnet 3 is halved to 100 ms by way of the charged capacitor of the storage means 25, discharged in the drawing-in phase. At the end of the drawing-in phase, the current consumption of the electromagnet 3 is then reduced to the holding current level of 30 mA.

As the line 40 indicates. The total current consumption of both electromagnets 2,3 rises, as the line 50 shows, only briefly during the switching process for the electromagnet 3 to an overall current consumption of 230 mA, and in the holding current phase of both electromagnets lies at 60 mA. If both electromagnets 2,3 are subjected exclusively to the voltage from the power unit 23, then, with the simultaneous switching on of both electromagnets, during the then longer switching-through time of 200 ms, the overall current consumption of both electromagnets would have been 400 mA. Thanks to the invention, it is possible for two further electromagnets to be switched in the same time, without the power unit 23 having to issue a higher power value. The advantages according to the invention take effect in particular with underground electrohydraulic support unit control devices, since as a result of the invention twice as many electromagnets can be switched in the same time and can be supplied by one common power unit.

For the person skilled in the art, a series of variations can be obtained from the foregoing Description, which fall within the scope of protection of the dependent Claims.

The person skilled in the art can in particular vary the manner in which the storage means is set up for the rapid increase of the voltage-applied to the coils. The reduction of the holding current can be effected as described in DE 102 12 092 A1. For the reduction of the holding current, however, other process methods can also be selected, without departing from the scope of protection of the patent claims.

The invention claimed is:

1. Mining electromagnet for switching hydraulic pilot or main control valves used in underground mining, with a coil which is adapted to be connected to an intrinsically-safe power unit serving to supply current and voltage to the coil, with an armature which can be displaced by feeding current to the coil and with a control device, by means of which the current which is fed can be adjusted in the drawing-in phase of the armature to an excitation current and in the holding phase to a holding current which is lower than the excitation current, wherein said electromagnet further comprises a storage means adapted to be charged with the power unit voltage, and adapted to be switched on by the initiation of a switching procedure for the electromagnet so as to be placed in series with the power unit, and whereby discharge of the storage means has the effect for the drawing-in phase of increasing the voltage applied to the coil of the electromagnet which is to be switched in comparison with the supply voltage of the power unit.

2. Electromagnet according to claim 1 wherein the storage means is adapted to be charged with the supply voltage of the power unit independently of the switching state of the electromagnet.

3. Electromagnet according to claim 2 wherein the storage means comprises a capacitor.

4. Electromagnet according to claim 2 wherein a dropping resistor for limiting the charge current supplied to the storage means is connected upstream of the storage means.

5. Electromagnet according to claim 2 wherein a capacity of the storage means is adapted such as to guarantee a voltage increase at least by the end of the drawing-in phase.

6. Electromagnet according to claim 2 wherein the storage means doubles the voltage applied in the drawing-in phase in comparison with the supply voltage of the power unit.

7. Electromagnet according to claim 1 wherein the storage means comprises a capacitor.

8. Electromagnet according to claim 7 wherein a dropping resistor for limiting the charge current supplied to the storage means is connected upstream of the storage means.

9. Electromagnet according to claim 7 wherein a capacity of the storage means is adapted such as to guarantee a voltage increase at least by the end of the drawing-in phase.

10. Electromagnet according to claim 7 wherein the storage means doubles the voltage applied in the drawing-in phase in comparison with the supply voltage of the power unit.

11. Electromagnet according to claim 1 wherein a dropping resistor for limiting the charge current supplied to the storage means is connected upstream of the storage means.

12. Electromagnet according to claim 1 wherein a capacity of the storage means is adapted such as to guarantee a voltage increase at least by the end of the drawing-in phase.

13. Electromagnet according to claim 1 wherein the storage means doubles the voltage applied in the drawing-in phase in comparison with the supply voltage of the power unit.

14. Electromagnet according to claim 1 wherein the storage means is integrated into the control device.

15. Electromagnet according to claim 14 wherein the electronic control device comprises a measuring device for measuring the actual current in the coil and an evaluation device for identifying a movement of the armature on the basis of the actual current measured.

16. Electromagnet according to claim 1 wherein several electromagnets are switchable on in cascade fashion by the control device or a superordinated switching device.

17. Electromagnet according to claim 16 wherein the superordinated switching device is a face control device or a support unit controller for an underground electrohydraulic support shield.

18. Electromagnet according to claim 1 wherein several two electromagnet assemblies with coil and armature, arranged in a common housing, are allocated to each control device.

19. A mining solenoid for switching hydraulic pilot or main control valves used in underground mining, said mining solenoid comprising:

a coil connected to an intrinsically-safe power unit serving to supply current and voltage to the coil, an armature adapted to be displaced by feeding current to the coil;

a control device, by means of which the current which is fed is adjusted in the drawing-in phase of the armature to an excitation current and in the holding phase to a holding current which is lower than the excitation current, said control device comprising a storage means adapted to be charged with the power unit voltage, which is adapted to be selectively switched on and placed in series with the power unit voltage for increasing the voltage applied to the coil in comparison with the supply voltage of the power unit.

* * * * *